US009912708B2

United States Patent
Zhou et al.

(10) Patent No.: US 9,912,708 B2
(45) Date of Patent: Mar. 6, 2018

(54) SYSTEMS AND METHODS FOR DUPLEX COMMUNICATION

(71) Applicant: DiviMath, Inc., San Jose, CA (US)

(72) Inventors: Caizhang Zhou, Fremont, CA (US); Wanpeng Cao, Fremont, CA (US); Chi-Ming Chu, Fremont, CA (US)

(73) Assignee: Divimath, Inc., Fremont, CA (US)

( * ) Notice: Subject to any disclaimer, the term of this patent is extended or adjusted under 35 U.S.C. 154(b) by 459 days.

(21) Appl. No.: 14/620,618

(22) Filed: Feb. 12, 2015

(65) Prior Publication Data

US 2015/0244752 A1  Aug. 27, 2015

Related U.S. Application Data

(60) Provisional application No. 61/944,212, filed on Feb. 25, 2014.

(51) Int. Cl.
*H04L 29/06* (2006.01)
*H04N 7/10* (2006.01)
*H04N 21/436* (2011.01)
*H04L 27/10* (2006.01)
*H04N 21/236* (2011.01)
*H04N 21/434* (2011.01)

(52) U.S. Cl.
CPC .......... *H04L 65/4069* (2013.01); *H04L 27/10* (2013.01); *H04L 65/60* (2013.01); *H04N 7/102* (2013.01); *H04N 21/23602* (2013.01); *H04N 21/436* (2013.01); *H04N 21/4342* (2013.01)

(58) Field of Classification Search
CPC ..... H04L 65/4069; H04L 65/60; H04L 27/10; H04N 7/102; H04N 7/18; H04N 21/23602; H04N 21/4342; H04N 21/436
See application file for complete search history.

(56) References Cited

U.S. PATENT DOCUMENTS

2005/0155082 A1* 7/2005 Weinstein .............. H04H 20/46 725/131
2008/0194208 A1* 8/2008 Tischer ................... H04L 12/66 455/68

(Continued)

OTHER PUBLICATIONS

HDcctv™ Standard S1101—Upstream Communications Channel—Mapping and Serial Data Format, Workding Draft Version 0.2, Nov. 8, 2011, 15 pages.

(Continued)

*Primary Examiner* — Brian J Gillis
*Assistant Examiner* — Amy Ling
(74) *Attorney, Agent, or Firm* — Davis Wright Tremaine LLP; Philip H. Albert

(57) ABSTRACT

A closed circuit video communication device includes an input/output configured to receive a streaming video signal on a first dedicated physical communication channel and to send upstream communication on the first dedicated physical communication channel; a video output configured to send the streaming video signal on a second dedicated physical communication channel; and a command input configured to receive commands on a third dedicated physical communication channel and to provide the commands to the input/output for sending as upstream communication on the first dedicated physical communication channel.

26 Claims, 5 Drawing Sheets

(56) References Cited

U.S. PATENT DOCUMENTS

2008/0301738 A1* 12/2008 Davies ................ H04N 5/4403
  725/87
2012/0236160 A1   9/2012 Rezek et al.
2013/0117797 A1   5/2013 Lam

OTHER PUBLICATIONS

HDcctv Alliance® Specification MKT-S0001—2009-11, HDcctv 1.0 Specification, 2009, 8 pages.
HDcctv Alliance™ Standard S2003—Control and Status Data Protocol & Data Packet Format, Feb. 19, 2013, 13 pages.
HDcctv Alliance Standard S1100—Video, Audio, Data and Metadata—Mapping and Serial Data Format, Working Draft Version 0.1, Mar. 8, 2011, 15 pages.
HDcctv Alliance Standard S2001—HDcctv Interface Stream ID, Working Draft Version 0.3, Nov. 6, 2013, 12 pages.
HDcctv Alliance® —Gennum V2.0 HDcctv Standards Proposal—Technical Overview, 2012, 59 pages.
HDcctv Alliance™ Standard 3000 Part 1—S3000 Part 1 HDcctv Control and Status Data Protocol: Administration and System Group Commands, Working Draft Version 0.12, Mar. 10, 2012, 39 pages.
HDcctv Alliance™ Standard 3000 Part 2—S3000 Part 2 HDcctv Control and Status Data Protocol: Image Group Commands, Working Draft Version 0.10, Aug. 14, 2012, 52 pages.
HDcctv Alliance™ Standard 3000 Part 3—S3000 Part 3 HDcctv Control and Status Data Protocol: Motion Group Commands, Working Draft Version 0.9, Jan. 22, 2013, 42 pages.
HDcctv Alliance™ Standard 3000 Part 4, 2011—S3000 Part 4 HDcctv Control and Status Data Protocol: External I/O Group Commands, Working Draft Version 0.4, Apr. 11, 2011, 17 pages.
HDcctv Alliance™ Standard 3000 Part 5, 2011—S3000 Part 5 HDcctv Control and Status Data Protocol: Audio Group Commands, Working Draft Version 0.4, Jun. 19, 2012, 16 pages.
HDcctv Alliance™ Standard 3000 Part 6—S3000 Part 6 HDcctv Control and Status Data Protocol: Encapulation Group Commands, Working Draft Version 0.3, May 15, 2013, 11 pages.
HDcctv Alliance™ Standard 3000 Part 7,—S3000 Part 7 HDcctv Control and Status Data Protocol: Link establishment and Maintenance Process, Working Draft Version 0.2, Jan. 29, 2013, 11 pages.
HDcctv Technology Preview, Global Digital Surveillance Forum Asia 2012, Enabling Brilliance™, Semtech Gennum Products, 21 pages.

* cited by examiner

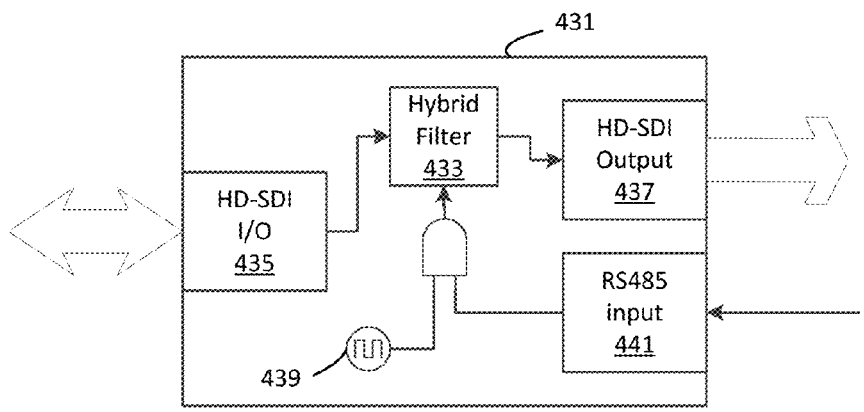
FIG. 4
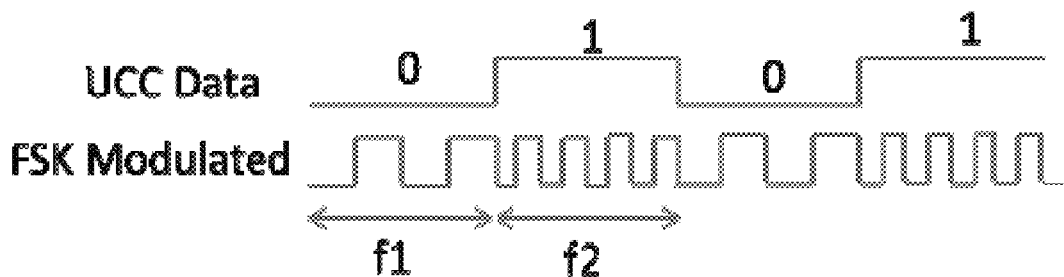
FIG. 5 Binary FSK modulation for LBUCC
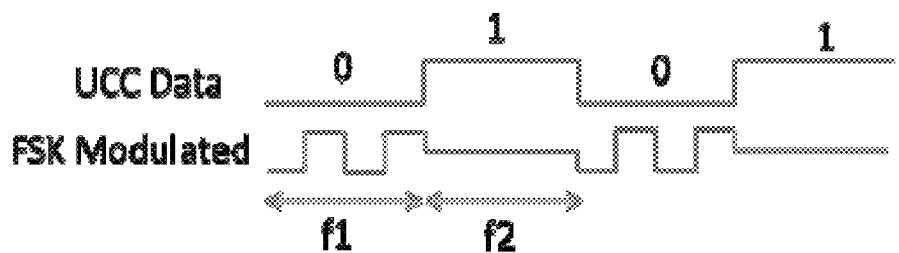
FIG. 6 Binary FSK modulation for LBUCC when f2=0

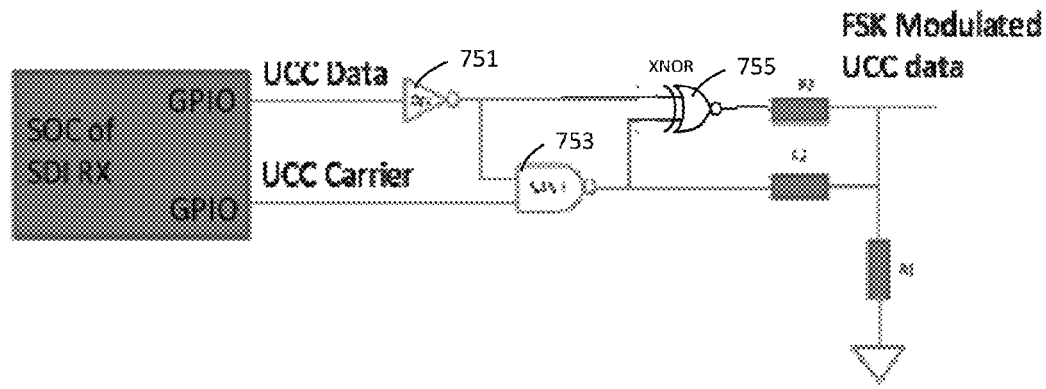
FIG. 7 . Binary FSK modulator Implementation for LBUCC when f2=0
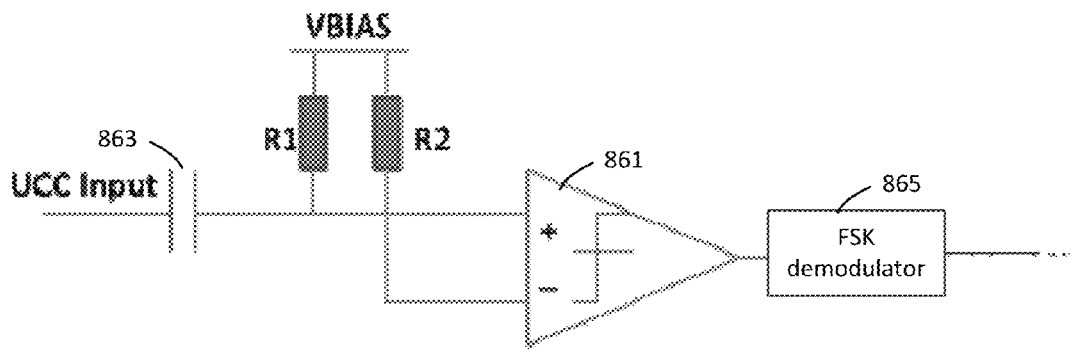
FIG. 8 Binary FSK demodulator Implementation for HBUCC
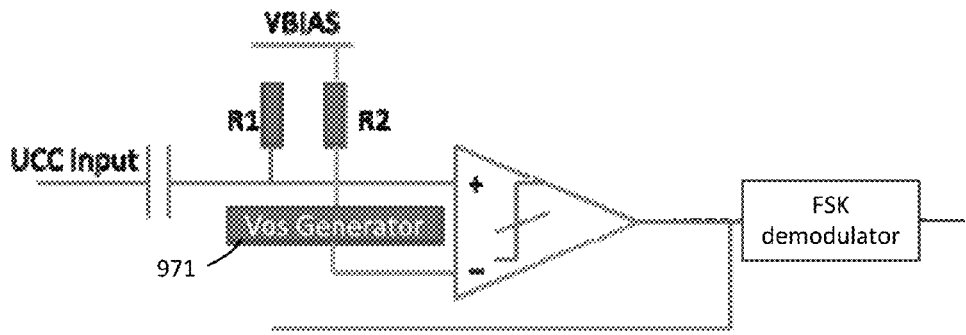
FIG. 9 . Dual-mode Binary FSK demodulator Implementation for UCC

SYSTEMS AND METHODS FOR DUPLEX COMMUNICATION

CROSS-REFERENCE TO RELATED APPLICATION

This application claims the benefit of U.S. Provisional Application No. 61/944,212 filed Feb. 25, 2014, and is herein incorporated in its entirety by this reference.

BACKGROUND

This application relates to communication over a dedicated physical communication link used for point-to-point video communication, such as a coaxial cable, and specifically to upstream communication (in opposite direction to video transmission) over such links.

FIG. 1 shows a typical prior art arrangement in which a video sender, such as a video camera, sends a stream of video data to a video receiver, such as a Digital Video Recorder (DVR) over a dedicated physical link such as a coaxial cable. Such arrangements are common, for example in the form of Closed Circuit Television (CCTV) systems that are frequently used for security purposes. While networked cameras (e.g. using Internet Protocol (IP) for communication over an intranet, or the Internet) may be used for video communication, such networks tend to suffer from latency, may provide poor video quality, and raise security concerns. Furthermore, coaxial cables are already installed for point-to-point communication in many locations where their replacement would be costly and/or difficult. High Definition (HD) video with low latency is possible over such links, for example using the HDCCTV standard. However, while HDCCTV communication may allow use of existing physical links, it may require significant new hardware at each end (e.g. new cameras and DVRs) may be expensive to implement, and may have limited functionality and flexibility. Therefore, there is a need for improved systems and methods for using dedicated communication links for point-to-point communication.

SUMMARY

Commands from a video receiver may be encoded for upstream communication over a dedicated point-to-point communication link using a simple encoding scheme in a communication unit that is external to the video receiver (e.g. a dongle). These commands may be demodulated easily at the video sender for execution. A video receiver may tune the output of the video sender remotely using such commands so that video transmission may be optimized for the particular physical communication link.

An example of a closed circuit video communication device includes: an input/output configured to receive a streaming video signal on a first dedicated physical communication channel and to send upstream communication on the first dedicated physical communication channel; a video output configured to send the streaming video signal on a second dedicated physical communication channel; and a command input configured to receive commands on a third dedicated physical communication channel and to provide the commands to the input/output for sending as upstream communication on the first dedicated physical communication channel.

The input/output may be a High Definition Serial Data Interface (HD-SDI) input/output, and the video output may be a HD-SDI output. The command input may be a serial port. The serial port may be one of: an RS232 port, or an RS485 port. The input/output, the video output, and the command input may each be formed as separate connectors configured for removable coupling of dedicated communication channels. The closed circuit video communication device may include a housing. A binary frequency shift key (FSK) modulation circuit may be located between the command input and the input/output, the FSK modulation circuit configured to transform a low frequency command from the third dedicated physical communication channel to a high frequency command for sending as upstream communication on the first dedicated physical communication channel. Commands may include at least one command to a sender of the streaming video signal on the first dedicated physical communication channel to modify a characteristic of the streaming video signal.

An example of a method of managing communication between a video transmitter and a video receiver includes: receiving a digital video signal from the video transmitter over a first dedicated communication link; sending the digital video signal to the video receiver over a second dedicated communication link; receiving a command from the video receiver over a third dedicated communication link; and sending the command to the video transmitter over the first dedicated communication link.

The digital video signal may be a High Definition Serial Digital Interface (HD-SDI) signal. The command from the video receiver may be encoded using binary Frequency Shift Key (FSK) modulation prior to sending the command to the video transmitter over the first dedicated communication link. The command may be an instruction to change a transmission parameter of the digital video signal sent by the video transmitter over the first dedicated communication channel. The transmission parameter of the digital video signal sent by the video transmitter over the first dedicated communication channel may change in response to the command. The transmission parameter of the digital video signal may be the signal strength of the digital video signal. The command may be one of a series of commands that change one or more transmission parameters as part of a transmission optimization process.

An example of a High Definition Serial Digital Interface (HD-SDI) link controller for managing communication on a dedicated HD-SDI video channel, includes; an output to a driver circuit, the output providing control information that controls at least one transmission parameter of a streaming video signal that is output by the driver circuit on the dedicated HD-SDI video channel; an input from the dedicated HD-SDI video channel; a command identification unit that identifies commands received by the HD-SDI link controller over the input from the dedicated HD-SDI video channel; and a command implementation unit that modifies the output to the driver circuit in response to commands identified by the command identification unit.

The at least one transmission parameter of the streaming video signal may include at least one of: driver signal strength, pre-emphasis setting, and slew rate control. The command identification unit may include a binary Frequency Shift Key (FSK) demodulator to identify commands. The binary FSK demodulator may be configured with a voltage offset to demodulate an FSK modulated command that is modulated using zero frequency (f=0). A command separation unit may separate commands received by the HD-SDI link controller over the input from the dedicated HD-SDI video channel into: commands for the HD-SDI link controller and commands for a host controller. An output to the host controller may be configured for sending commands for the host controller. The output to the host controller may be formed by a Universal Asynchronous Receiver/Transmitter (UART).

An example of a method of optimizing video transmission over a dedicated physical communication link from a video sender includes: sending a High Definition Serial Digital Interface (HD-SDI) video signal from the video sender over the dedicated communication link; subsequently receiving a command over the dedicated physical communication link to modify the at least one transmission parameter; and at the video sender, in response to the command, modifying at least one transmission parameter for the HD-SDI video signal.

Steps (a)-(c) may be repeated over multiple iterations with multiple transmission parameter settings. The at least one transmission parameter may include at least one of: signal strength, pre-emphasis setting, and UCC bandwidth selection. The command received over the dedicated physical communication link may be demodulated using binary Frequency Shift Key (FSK) demodulation.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

BRIEF DESCRIPTION OF THE DRAWINGS

FIG. 4 shows a more detailed view of the video communication device of FIG. 3.
FIG. 5 illustrates a modulation scheme.
FIG. 6 illustrates an example of binary FSK modulation.
FIG. 7 illustrates an example of modulation circuitry.
FIG. 8 illustrates an example of demodulation circuitry.
FIG. 9 illustrates another example of demodulation circuitry.

DETAILED DESCRIPTION

Figure 1:
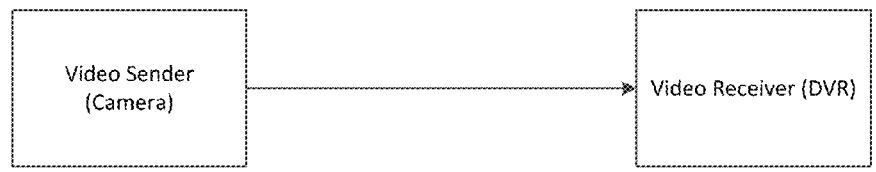
FIG. 1 shows a prior art video sender and receiver.
Figure 2:
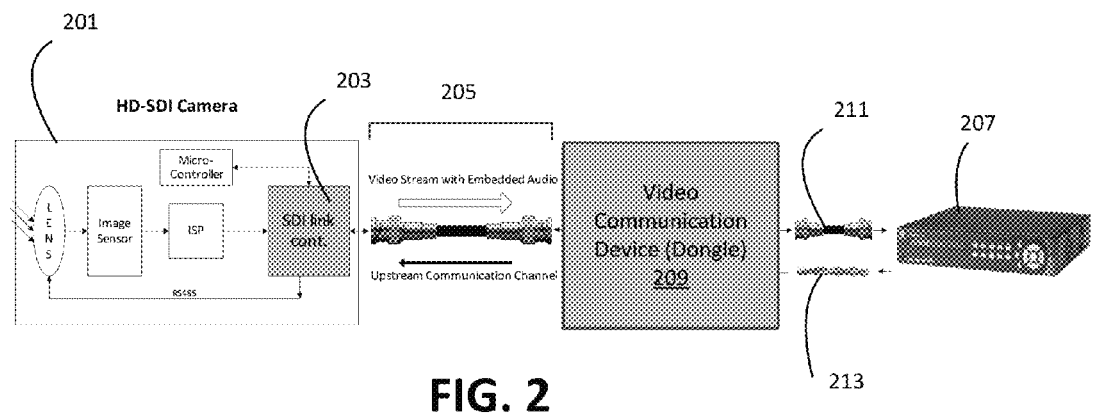
FIG. 2 shows an example of a system with a video communication device.

FIG. 2 illustrates an example of duplex communication over a dedicated physical link according to an aspect of the present invention. In particular, FIG. 2 shows a High Definition Serial Digital Interface (HD-SDI) camera 201 that includes a Serial Data Interface (SDI) link controller 203 to manage communication over a dedicated communication link 205. In this case, the dedicated communication link 205 is a conventional coaxial cable such as commonly used for sending video data from a security camera, or other camera.

A traditional Digital Video Recorder (DVR) 207 serves as a video receiver that allows recording of the video sent by camera 201. In addition, the traditional DVR 207 has an output that allows the DVR to send commands to a camera, for example to zoom, pan, or tilt the camera. The output is provided over a serial cable 213 that is separate from coaxial cable 211, such as an RS232, RS485, or similar serial cable. While some traditional DVRs include such outputs, a separate cable may be required to allow commands or other data (e.g. audio) to be provided to a camera, thus adding cost and complexity, particularly in facilities with large numbers of cameras and widely dispersed locations. In some cases, this functionality goes unused because of the extra cost and inconvenience of additional wiring. Even if a DVR has some capacity to send commands or other data over the same physical link that is used to receive video data (e.g. to send commands to a camera over a coaxial cable on which the camera is sending video data) such upstream communication may be limited to a particular command set and/or particular bandwidth and requires a camera that is compatible with such communication which may be expensive.

Between camera 201 and traditional DVR 207 is a video communication device 209 which takes the command output from the traditional DVR and sends it over dedicated physical link 205, which is the same coaxial cable that is used by the camera 201 for transmission of video data to DVR 207 in this example. Thus, while video data is streamed from camera 201 to traditional DVR 207 in what may be referred to as the "downstream" direction, commands are sent by video communication device 209 in the "upstream" direction to the camera 201 over the same dedicated physical link. This efficiently uses the link and may obviate the need for a separate command/control channel to the camera. While a video communication device may be located anywhere between a camera and a traditional DVR, locating the device closer to the traditional DVR requires less wiring because a single coaxial cable 205 connects the camera to the device while an additional cable (serial cable 213) extends from the traditional DVR to the device. According to the example shown, video communication device 209 is formed as a dongle that is attached directly to the traditional DVR 207, or a short distance from the traditional DVR so that coaxial cable 211 and dedicated command cable 213 may be short or unnecessary. In some cases, the video communication device may be inserted into a traditional DVR (i.e. may be located within the housing of the DVR).

Figure 3:
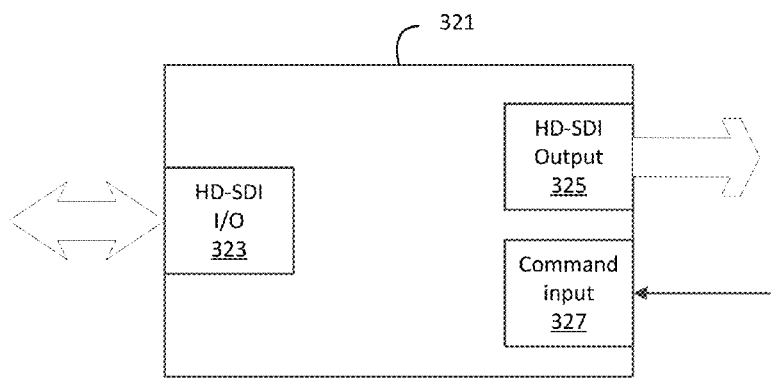
FIG. 3 shows an example of a video communication device.

FIG. 3 shows an example of a video communication device 321 (e.g. dongle 209) which may be formed as a dongle or otherwise. Video communication device 321 includes a HD-SDI input/output 323 for connection to a video camera over a dedicated point-to-point physical link. The HD-SDI input/output 323 is configured to receive video data from the camera in the downstream direction and to send command data in the upstream direction to the video camera over a single physical link. In one arrangement, a HD-SDI input/output includes a connector to facilitate connection of a coaxial connector of a coaxial cable (e.g. BNC type connector, or similar connector). A HD-SDI output 325 is configured to send the video data received by the HD-SDI input/output 323 in the downstream direction (e.g. to a DVR). The HD-SDI output 325 may include a coaxial connector that is similar to the HD-SDI input/output connector. Thus, video communication device 321 can be inserted into a line with similar connectors on each end. A command input 327 is provided for receiving command data. For example, an RS232, RS485, or similar input may be provided, including a physical connector for a corresponding cable. The commands received are then subject to some operations described below and are sent upstream through the HD-SDI input/output.

According to an example, a video communication device is formed as a dongle, which may include a housing, or enclosure, that substantially encloses the circuits of the device and provides environmental protection. Such a dongle may include short portions of cable for connection to a DVR (i.e. a short portion of coaxial cable with connector at the end for video, and a short portion of RS485 cable with connector at the end for commands. These cables may be integral with the dongle or may be removable. The dongle may include other features including, but not limited to, Light Emitting Diodes (LEDs) or other features to indicate status of the device (e.g. power on, commands enabled, etc.) and one or more switches to allow direct control of the device.

FIG. 4 shows a more detailed view of an example of a video communication device 431. A hybrid filter 433 is shown between HD-SDI input/output 435 and the output to the DVR 437. The hybrid filter 433 allows a video signal to pass directly through video communication device 431 to a DVR while preventing commands from going downstream to the DVR. Thus, commands are sent upstream only (i.e. sent through HD-SDI input/output 435 to the camera, not sent through HD-SDI output 437 to the DVR) and such Upstream communication may be referred to as an Upstream Communication Channel (UCC). Video communication device 431 includes a clock 439 that generates a clock signal that is combined with commands from a command input 441 in order to modulate commands prior to sending upstream. In other examples, commands may be modulated in other ways. In some cases, a clock signal may be received from an external source so that a video communication device may not need an internal clock circuit, thus simplifying the circuitry further. For example, a clock signal may be received from a DVR. Power may also be received from the DVR, either through a dedicated power connection, or using a coaxial cable or another connection.

FIG. 5 illustrates a modulation scheme that may be used to modulate commands received from a DVR, or similar device, prior to sending them over a dedicated communication link such as a coaxial cable used for HD-SDI communication. In some examples, commands may be received at a low frequency, or Low Bandwidth UCC (LBUCC) that is not suitable for directly transmitting over such a link so that some form of modulation is desirable. The present example provides a simple modulation scheme that can be implemented without complex or expensive circuitry. In some cases, additional High Bandwidth UCC (HBUCC) may be used. For example, a DVR may have functionality that allows it to send HBUCC commands to a camera. In this case, the LBUCC may be used to provide additional commands that may not be available in a particular DVR-to-camera protocol. Thus, the LBUCC may be the only form of upstream communication, or may be used in conjunction with HBUCC in a complementary manner. Use of one of these forms of upstream communication does not preclude use of the other.

FIG. 5 shows an example of a received LBUCC signal ("UCC Data") on the top and a modulated UCC ("FSK modulated") signal below. The modulated signal is modulated by binary Frequency Shift Key (FSK) modulation in this example. The two logic states in the UCC data are replaced with intervals of different frequencies, f1 for logic 0, and f2 for logic 1. Thus, a lower frequency signal is modulated to produce a higher frequency signal that is more suitable for transmission over the dedicated communication link.

FIG. 6 shows a particular example of binary FSK modulation in which one of the frequencies, f2, is zero. Thus, the modulated output consists of intervals of relatively high frequency oscillation (relative to the unmodulated data) and static intervals during which the signal remains at a predetermined level. In this case the predetermined level is a mid-level that is at or near the midpoint of the high frequency oscillation. In this way the signal remains balanced even when sending a zero frequency bit (nonzero frequency such as the high frequency oscillation shown is inherently balanced).

FIG. 7 shows an example of a circuit for implementing the modulation shown in FIG. 5. In particular, FIG. 6 shows UCC data sent to an inverter 751. The output of inverter 751 goes to a NAND gate 753 which receives another input that is the UCC carrier (i.e. signal at frequency f1). The output of inverter 751 also goes to an XNOR gate 755, with the second input to the XNOR gate coming from the output of the NAND gate 753. When the UCC data bit is high (logic 1), its inverse is low (logic 0) and the output of the NAND gate 753 remains high (logic 1) thus providing a low output from the XNOR gate 755. The FSK modulated voltage is then at an intermediate level between the high output of NAND gate 753 and the low output of XNOR gate 755 (corresponding to f2 of FIG. 6). The level may be established by choosing appropriate resistance values for R1 and R2. When the UCC data bit is low, its inverse is high and the output of the NAND gate 753 is the inverted carrier signal. The output of NAND gate 753 goes to XNOR gate 755 which has a high voltage on its other terminal so that the XNOR also outputs the inverted carrier signal. Thus, the FSK modulated voltage is simply the inverse of the carrier signal (corresponding to f1 of FIG. 6). Resistors, R1, R2, and R3 are provided to form a voltage divider so that the output is at an appropriate level. In particular, resistances are chosen so that the output for zero frequency is in the middle of the signal range thus providing a balanced output. It will be understood that the logic gates shown form a simple circuit that may be implemented in programmable logic or some other low-cost manner. In the example shown, both the UCC data and the UCC carrier are provided by a SDI receiver (e.g. an HD-SDI receiver such as a DVR). The logic gates may be provided in a separate unit such as a dongle, or may be integrated with an SDI receiver, either on the same chip, on a separate chip mounted on a common PCB, or otherwise. In some cases, logic gates may be implemented in programmable logic in a chip that is used for other functions also.

At the receiving end of the dedicated point-to-point communication link, modulated UCC commands may be demodulated and converted into an appropriate form for subsequent processing. Suitable circuits may be provided to receive and demodulate the commands without impeding video data going downstream.

FIG. 8 shows an example of a demodulation circuit that is capable of handling both HBUCC and LBUCC data. A UCC input (from the dedicated physical link) is provided to a comparator 861 where it is compared with a fixed reference. Restoration resistors R1 and R2 have resistances chosen to bias the UCC input (which is AC coupled through a capacitor 863) to appropriate levels. The opamp gain is set to restore the received signal to an appropriate voltage range that is then demodulated by the FSK demodulator 865, which reverses the modulation shown in FIG. 6 (i.e. converts FSK modulated data to UCC data).

FIG. 9 shows an example of a modified demodulation circuit that is similar to the demodulation circuit of FIG. 8, with an additional offset voltage generator 971 that offsets the reference voltage to allow decoding of binary FSK encoded data with f=0 (e.g. f2 of FIG. 6). In this case, the reference voltage is offset so that when a bit is received that is represented by f=0 with the signal level at mid-range, the comparator shows a difference between the reference voltage and the signal (i.e. the reference voltage is offset from mid-range). Demodulation may be performed within a camera that sends video data over the dedicated physical link. In some cases, such demodulation is performed within a dedicated unit, such as a dedicated chip (which may be mounted on a Printed Circuit Board (PCB) that is shared with other camera components). In other examples, demodulation is performed by circuits that also perform other functions, for example in a logic circuit that is configured by firmware to perform demodulation along with other functions. In other examples, demodulation may be performed in a removable unit such as a dongle, which may be external to the camera. It will be understood that aspects of the present invention may be embodied in various physical arrangements depending on the context.

Figure 10:
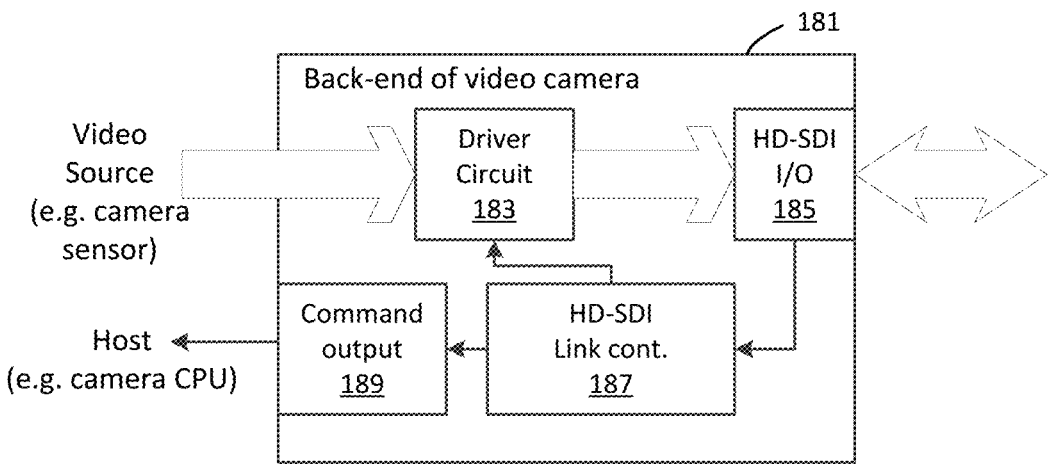
FIG. 10 illustrates an example of an HD-SDI link controller.

FIG. 10 shows an example of HD-SDI link controller that is part of the back end of a video camera 181. Video data is streamed from the camera's video source (e.g. from a sensor, such as a CCD sensor, or CMOS sensor) to a driver circuit 183 which then drives the HD-SDI signal through HD-SDI input/output 185 onto the dedicated physical link (e.g. coaxial cable). The HD-SDI link controller 187 receives an input from HD-SDI input/output 185 through which it receives UCC data, including LBUCC commands. The HD-SDI link controller 187 has an output to the driver circuit 183. When the HD-SDI link controller 187 receives commands directed to transmission parameters it may cause the driver circuit 183 to change one or more transmission parameters by issuing appropriate instructions through this output. This allows a video receiver such as a DVR to issue commands to the video sender to modify transmission parameters in order to improve the quality of received video data. HD-SDI link controller 187 also provides an output to a command output unit 189, which in turn provides an output to a host such as a camera Central Processing Unit (CPU). This allows commands that are not related to transmission parameters (e.g. commands to a camera controller) that are obtained by the HD-SDI link controller 187 to be passed on to the CPU. In some simple cameras, there may be no CPU and hence no command output unit. Upstream commands in such systems may all be acted on by HD-SDI link controller 187. In some cases, the functions of a HD-SDI link controller may be expanded beyond transmission parameters so that the SDI-link controller may provide some of the advantages of remote access without the cost of a camera CPU.

Figure 11:
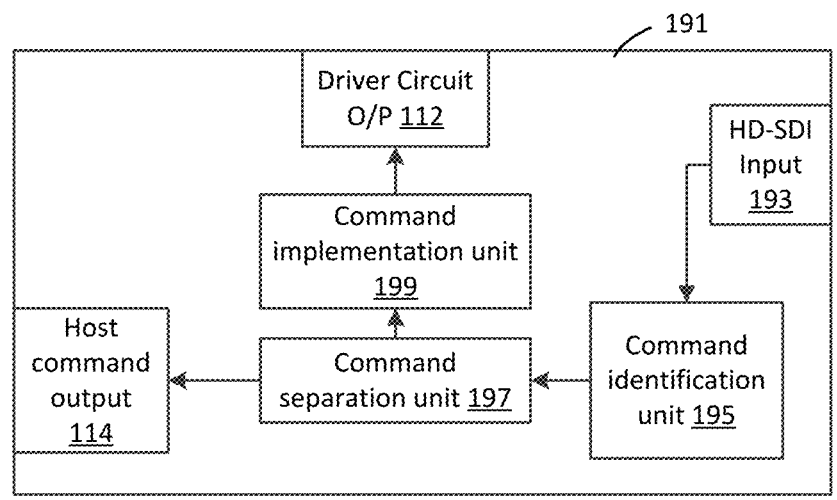
FIG. 11 illustrates another example of an HD-SDI link controller.

An example of an SDI link controller 191 is provided in FIG. 11. This shows an HD-SDI input 193 that is connected to a command identification unit 195. The command identification unit 195 identifies upstream commands that are sent over a dedicated communication link. These commands are then sent to a command separation unit 197 in which commands are separated into commands that are directed to the host (e.g. to the camera CPU) and commands directed to the HD-SDI link controller 191. In this example, commands that are directed to the host are HBUCC commands, while commands that are directed to the HD-SDI link controller are LBUCC commands. In other examples, commands may be arranged differently (e.g. HD-SDI link controller commands may include HBUCC commands and/or host commands may include LBUCC commands). Commands that are directed to the HD-SDI link controller 191 are passed on to a command implementation unit 199, which causes a driver circuit output 112 to send a command to the driver circuit to make a corresponding change to at least one transmission parameter. It will be understood that additional outputs may also be provided to allow the HD-SDI link controller 191 to control other camera components directly. Host commands are sent to a host command output 114 and then to the host. According to an example, a HD-SDI link controller shown may be formed on a dedicated die (i.e. on a portion of a Silicon substrate) that is individually packaged and mounted on a circuit board with other components. In other examples, HD-SDI link controller and other components may be integrated on a single chip, or otherwise combined.

Figure 12:
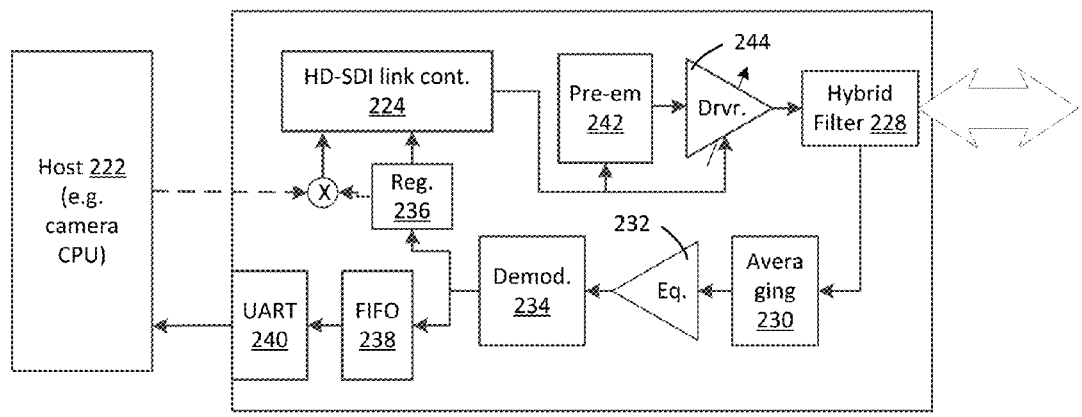
FIG. 12 illustrates an example of a circuit communicating over a dedicated physical link.

FIG. 12 shows an example of hardware to provide UCC data to a host 222 and to a HD-SDI link controller 224 over a dedicated physical link. UCC communication from the dedicated physical link passes through a hybrid filter 228 and then through an averaging unit 230 and equalizer 232 in order to improve signal quality prior to demodulation. A UCC demodulator 232 may include binary FSK demodulation as previously described and may include additional demodulation capacity for HBUCC (e.g. 5b-4b decoding capacity). Demodulated commands may be either directed to the HD-SDI link controller 224 or to the host. If they are directed to the HD-SDI link controller 224 then they are sent to a register 236 and then to the HD-SDI link controller 224 for execution. If they are directed to the host then they are sent to a First In First Out (FIFO) queue 238 and then to a Universal Asynchronous Receiver/Transmitter (UART) transmitter 240 which sends the commands to the host 222 at a data rate that is compatible with the host's capacity to receive such data (which may be low). Thus, commands may be sent in an appropriate format for the host. In some cases, a host may also send commands to control a HD-SDI link controller (as shown by dashed line). The HD-SDI link controller is in communication with driver circuits including pre-emphasis unit 212 and cable driver unit 244. This allows the HD-SDI link controller 224 to modify various transmission parameters based on commands received from a video receiver (e.g. DVR) or from a host (e.g. camera CPU).

Applications

The hardware described above has various applications. For example, transmission parameters of the video signal transmitted by the sender may be adjusted remotely through the same dedicated communication link that is used for video. This allows a video receiver to adjust the settings that the video sender uses to transmit video data, without additional wiring, and without outside intervention. In one example, a video receiver may tune the output of a video sender remotely by changing one or more transmission parameters until satisfactory video quality is achieved. Transmission parameters may include transmission signal strength, pre-emphasis settings, and slew rate control. Video transmission may be automatically optimized by a DVR or other receiver in this way. For example, the DVR may try a range of different transmission parameters in order to find optimal settings for the particular dedicated communication link.

In some cases, such a tuning operation allows a video signal to be satisfactorily received over a longer cable than is otherwise possible. For example, HD-SDI signals are specified for up to 200 meters over RG59 cable, but it has been found that by optimizing transmission parameters of a video sender, communication over much greater lengths may be achieved. While such tuning could be done manually in some cases, this would be tedious, time-consuming, and prone to human error and may require access to locations that are difficult and/or dangerous to access. Using upstream communication allows such optimization to be performed simply, rapidly, and with little or no human intervention. Optimization may be performed once as part of a set-up procedure and/or may be performed periodically so that video quality is maintained at a high level over an extended period.

In some cases, older Standard Definition (SD) SDI systems are being replaced with HD-SDI systems. The ability to automatically optimize transmission in such systems may allow existing cables to be used for HD-SDI video, even where the cables are not specified for such use (because of a combination of length and grade of cable).

Some HD-SDI components lack UCC functionality. For example, HD-SDI cameras may send a HD signal over a physical link, but may not be configured to receive UCC commands over the link. HD-SDI DVRs may receive video over a dedicated physical link, but may have a separate output for commands or other communication in the upstream direction rather than having UCC capability. Aspects of the present invention allow improved use of such components by adding UCC functionality in a relatively simple and cost-effective manner.

Downstream Communication Channel

Figure 13:
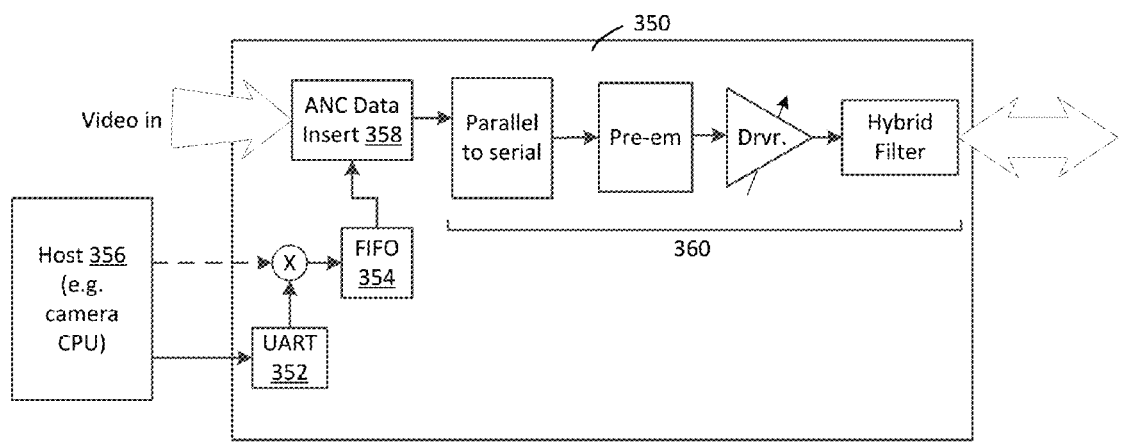
FIG. 13 illustrates downstream communication.

FIG. 13 shows an example of how downstream communication may be implemented on a dedicated point-to-point communication link so that, for example, a host such as a camera CPU can send data over the same link used for sending video data. This allows such a host to send data from sensors other than the video sensor. For example, data regarding camera status, or from one or more motion detectors, smoke detectors, gas detectors, or other environmental detectors may be sent through such a downstream communication channel. Thus, environmental or other data may be sent in addition to video data over a given physical communication link. While such data may come from a host (e.g. camera CPU) in some cases, it may also be provided directly from a sensor (e.g. motion sensor) to a HD-SDI link controller so that a camera CPU is not necessary.

The system 350 of FIG. 13 uses a dedicated UART interface 352 and a FIFO 354 for ancillary data insertion. Data from a host 356 is sent to the UART 352 and then to the FIFO 354 (e.g. 128-byte FIFO) and is then automatically encapsulated into an ancillary packet and inserted into video data by data insertion unit 358. The video data is then processed by circuits 360 (e.g. parallel to serial conversion etc.) and sent over the dedicated physical link.

CONCLUSION

The foregoing detailed description has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

It is claimed:

1. A closed circuit video communication device comprising:
    an input/output configured to receive a streaming video signal on a first dedicated physical communication channel and to send upstream communication on the first dedicated physical communication channel;
    a video output configured to send the streaming video signal on a second dedicated physical communication channel;
    a command input configured to receive commands on a third dedicated physical communication channel and to provide the commands to the input/output for sending as upstream communication on the first dedicated physical communication channel; and
    a circuit between the command input and the input/output configured to transform a command having a first frequency from the third dedicated physical communication channel to a command having a second frequency and send the command as upstream communication on the first dedicated physical communication channel.

2. The closed circuit video communication device of claim 1 wherein the input/output is a High Definition Serial Data Interface (HD-SDI) input/output, and the video output is a HD-SDI output.

3. The closed circuit video communication device of claim 1 wherein the command input is a serial port.

4. The closed circuit video communication device of claim 3 wherein the serial port is one of: an RS232 port, or an RS485 port.

5. The closed circuit video communication device of claim 1 wherein the input/output, the video output, and the command input are each formed as separate connectors configured for removable coupling of dedicated communication channels.

6. The closed circuit video communication device of claim 1, further comprising a housing.

7. The closed circuit video communication device of claim 1, wherein the circuit is a binary frequency shift key (FSK) modulation circuit, the modulation circuit configured to transform a low frequency command to a high frequency command.

8. The closed circuit video communication device of claim 1 wherein commands include at least one command to a sender of the streaming video signal on the first dedicated physical communication channel to modify a characteristic of the streaming video signal.

9. A method of managing communication between a video transmitter and a video receiver comprising:
    receiving a digital video signal from the video transmitter over a first dedicated communication link;
    sending the digital video signal to the video receiver over a second dedicated communication link;
    receiving a command on a first frequency from the video receiver over a third dedicated communication link;
    transforming the command from the first frequency to a second frequency; and
    sending the command at the second frequency to the video transmitter over the first dedicated communication link.

10. The method of claim 9 wherein the digital video signal is a High Definition Serial Digital Interface (HD-SDI) signal.

11. The method of claim 9 further comprising encoding the command from the video receiver using binary Frequency Shift Key (FSK) modulation prior to sending the command to the video transmitter over the first dedicated communication link.

12. The method of claim 9 wherein the command is an instruction to change a transmission parameter of the digital video signal sent by the video transmitter over the first dedicated communication link.

13. The method of claim 12 further comprising, changing the transmission parameter of the digital video signal sent by the video transmitter over the first dedicated communication link in response to the command.

14. The method of claim 13 wherein the transmission parameter of the digital video signal is a signal strength of the digital video signal.

15. The method of claim 13 wherein the command is one of a series of commands that change one or more transmission parameters as part of a transmission optimization process.

16. A High Definition Serial Digital Interface (HD-SDI) link controller for managing communication on a dedicated HD-SDI video channel, comprising:
 an output to a driver circuit, the output providing control information that controls at least one transmission parameter of a streaming video signal that is output by the driver circuit on the dedicated HD-SDI video channel;
 an input from the dedicated HD-SDI video channel;
 a command identification unit that identifies commands received on a first frequency by the HD-SDI link controller over the input from the dedicated HD-SDI video channel; and
 a command implementation unit that sends a command on a second frequency on the output to the driver circuit in response to commands identified by the command identification unit.

17. The HD-SDI link controller of claim 16 wherein the at least one transmission parameter of the streaming video signal includes at least one of: driver signal strength, pre-emphasis setting, and slew rate control.

18. The HD-SDI link controller of claim 16 wherein the command identification unit includes a binary Frequency Shift Key (FSK) demodulator to identify commands.

19. The HD-SDI link controller of claim 18 wherein the binary FSK demodulator is configured with a voltage offset to demodulate an FSK modulated command that is modulated using zero frequency (f=0).

20. The HD-SDI link controller of claim 16 further comprising a command separation unit that separates commands received by the HD-SDI link controller over the input from the dedicated HD-SDI video channel into: commands for the HD-SDI link controller and commands for a host controller.

21. The HD-SDI link controller of claim 20 further comprising an output to the host controller for sending commands for the host controller.

22. The HD-SDI link controller of claim 21 wherein the output to the host controller is formed by a Universal Asynchronous Receiver/Transmitter (UART).

23. A method of optimizing video transmission over a dedicated physical communication link from a video sender, comprising:
 (a) sending a High Definition Serial Digital Interface (HD-SDI) video signal from the video sender over the dedicated physical communication link;
 (b) subsequently receiving a command over the dedicated physical communication link to modify at least one transmission parameter;
 (c) demodulating the command received over the dedicated physical communication link; and
 (d) at the video sender, in response to the command, modifying at least one transmission parameter for the HD-SDI video signal.

24. The method of claim 23 further comprising: repeating steps (a)-(c) over multiple iterations with multiple transmission parameter settings.

25. The method of claim 23 wherein the at least one transmission parameter includes at least one of: signal strength, pre-emphasis setting, and UCC bandwidth selection.

26. The method of claim 23, wherein demodulating the command uses binary Frequency Shift Key (FSK) demodulation.

* * * * *